United States Patent [19]

Takahashi

[11] 4,035,815

[45] July 12, 1977

[54] DISPLAY UNIT FOR LUMINOUS DATA OF A SINGLE LENS REFLEX CAMERA

[75] Inventor: Akira Takahashi, Tokyo, Japan

[73] Assignee: Ricoh Co., Ltd., Tokyo, Japan

[21] Appl. No.: 436,639

[22] Filed: Jan. 25, 1974

[30] Foreign Application Priority Data

Jan. 29, 1973 Japan .............................. 48-12269

[51] Int. Cl.² ...................................... G03B 17/20
[52] U.S. Cl. .................... 354/53; 354/23 D; 354/50; 354/51; 354/56; 354/60 L
[58] Field of Search ............... 354/53, 54, 56, 60 L, 354/50, 51, 60 A

[56] References Cited

U.S. PATENT DOCUMENTS

| | | | |
|---|---|---|---|
| 3,798,662 | 3/1974 | Suzuki | 354/60 L |
| 3,843,249 | 10/1974 | Kitaura | 354/60 A |
| 3,895,875 | 7/1975 | Kitaura et al. | 354/53 |
| 3,909,137 | 9/1975 | Kisanuki | 354/60 L |
| 3,955,892 | 5/1976 | Numata et al. | 354/23 D |
| 3,971,048 | 7/1976 | Ito et al. | 354/60 L |

*Primary Examiner*—Russell E. Adams
*Attorney, Agent, or Firm*—Cooper, Dunham, Clark, Griffin & Moran

[57] ABSTRACT

A display object illumination or unit for displaying luminous data is provided, wherein the data is retained in a memory circuit upon completion of the photometry operation in a single lens reflex camera, which is adapted to determine the exposure factors automatically to permit taking pictures at a proper exposure by measuring the brightness of an object being photographed.

10 Claims, 9 Drawing Figures

DISPLAY UNIT FOR LUMINOUS DATA OF A SINGLE LENS REFLEX CAMERA

BACKGROUND OF THE INVENTION

The invention relates to a display unit for object illumination data in a single lens reflex camera, in particular such a camera incorporating an electronic shutter.

Referring to FIG. 1 to describe the background of the invention, there is shown a single lens reflex camera including a taking lens 1 and a film surface 2. Intermediate the lens 1 and the film surface 2 is disposed a movable reflecting mirror 3 at an inclination of 45° to permit the light which passes through the taking lens 1 to enter a finder light path in order to focus the image of an object being photographed on a focussing screen 4 located at a position conjugate to the film surface 2 with respect to the movable reflecting mirror 3. The image on the screen 4 is viewed through a condenser lens 5, Pentadachprism 6 and an eyepiece 7, thereby enabling the same image as the one being photographed to be observed through the finder.

In order to determine proper values of the exposure factors such as shutter speed, diaphragm aperture or the like automatically in such a camera, a light receiving element 8 is located within the light path of the finder to effect photometry of the light from an object being photographed. This is known as a TTL (through the lens) photometry system.

However, when an electronic shutter is incorporated into such a camera, the incidence of light onto the light receiving element which determines the exposure period is interrupted to thereby preclude a proper determination of the exposure period by the electronic shutter, because when taking pictures, the reflecting mirror 3 is moved out of the path of the photographing light closing off the finder light path. As a consequence, when using an electronic shutter in a single lens reflex camera, a memory circuit is used to store the object illumination data obtained before the movable reflecting mirror 3 is moved out of the path of the photographing light, and the stored data is subsequently used to determine the exposure period.

The means for storing the illumination data may be analogue in nature where the light receiving element comprises CdS, the voltage from the CdS element being compressed logarithmically with respect to the light quantity and stored across a capacitor and the capacitor voltage being again expanded logrithmically in the up position of the mirror to drive the shutter. Alternatively, the storing means may be constructed in a digital manner by using an arrangement such that the light quantity which is incident on the light receiving element as an analogue quantity is counted in terms of pulses, which pulses are stored in a memory circuit capable of storing a digital quantity in terms of a combination of resistances or current values, the stored data being read out through a digital-to-analogue converter (referred to hereinafter as D-A converter) in the up position of the mirror to drive the shutter.

It is desirable that the illumination data thus obtained be displayed in some form to a photographer. With a single lens reflex camera incorporating an electronic shutter, the exposure period is automatically determined and a photographer can not know how fast the shutter operated. It will be advantageous for the benefit of affording the photographer with information concerning the parameters of taking pictures if the object illumination data, such as the exposure period which is determined automatically, can be displayed. It is also desirable that such ilumination data be displayed within the light path of the finder in a single lens reflex camera.

While there have been some cameras which provide a display of the exposure period, they involve the use of a meter as display means. However, such a display provided by the pointer of a meter has a disadvantage in that such a display can only be read with great difficulty. It will be appreciated that the illumination data can be readily read if the display is provided by a display element 9 such as lamp as shown in FIG. 1.

However, the placement of a lamp display 9 within the light path of the finder may cause an error in the illumination data because the light receiving element 8 also measures the light quantity from such a display element. Such an error will be pronounced particularly when taking a picture of an object which is under dim illumination. Referring to FIG. 1, it will be appreciated that the light Bv from an object being photographed passes through an optical system including the taking lens 1, movable reflecting mirror 3, pentaprism 6 and the like before reaching the light receiving element, so that a considerable amount of attenuation occurs, the resulting reduction in the light er dim illumination.

There is another problem involved with such a positioning of the display. When a bright display takes place within the finder, the pupil of a man will respond to the brightness thereof, with the result that a dark image of the object which is focussed on the focussing screen 4 within the light path of the finder can not be clearly recognized or the luminescent display is viewed as glaring.

SUMMARY OF THE INVENTION

The present invention provides a display unit for object illumination data of a single lens reflex camera including a memory element such as an electronic shutter in which the brightness of an object being photographed is automatically measured by a light receiving element disposed within the light path of a finder and is subsequently stored in a memory circuit, the display unit including a luminescent display element such as a lamp disposed within the light path of the finder, which element is maintained inoperative during the photometry and is caused to illuminate to provide a display of luminous data within the light path of the finder upon termination of the photometry or immediately thereafter.

It is an object of the invention to provide a display unit for object illumination data adapted to provide a luminescent display of the data within the light path of a finder in a manner such that the intensity of the luminescence varies with the brightness of an object being photographed so that the display is bright when the object is under bright illumination and is dark when the object is under dim illumination.

DETAILED DESCRIPTION OF EMBODIMENTS

As mentioned previously, the memory means for storing illumination data may be either analogue or digital in nature. When using an analogue memory, it is generally impossible to produce an end-of-photometry signal because the illumination data to be stored varies as an analogue quantity. When applying the invention to such an analogue memory, a maximum photometry period is suitably established within which to store the illumination data in a memory circuit, and after the established period has elapsed, an end-of-photometry signal is applied to the memory circuit to terminate the photometry. Simultaneously or immediately thereafter, a luminescent display element such as lamp is caused to emit light.

Figure 2:
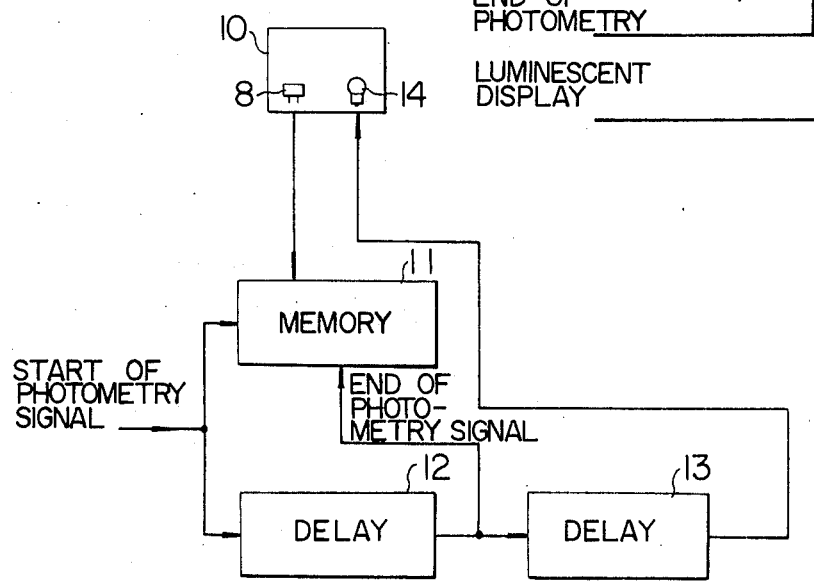
FIG. 2 is a block diagram of the display unit for object illumination data in accordance with one embodiment of the invention.

More specifically, FIG. 2 shows a light receiving element 8 disposed within the light path of a finder 10. An output produced from the element 8 as a result of photoelectric conversion is stored in a memory circuit 11 which is actuated by a start-of-photometry signal. The start-of-photometry signal is also applied to a delay circuit 12, which functions to limit the period of time during which the memory circuit 11 is operative. Specifically, upon the lapse of a preselected period of time, the delay circuit 12 produces an end-of-photometry signal, which is applied to the memory circuit 11 to render it inoperative. The period of time established for the dealy circuit 12 is chosen to be a minimum length which allows photometry of every object whose brightness permits it to be photographed. The end-of-photometry signal produced by the delay circuit 12 is applied to another delay circuit 13, which initiates the luminescence or illumination of a luminescent display element 14 such as a lamp disposed within the light path of the finder.

Figure 1:
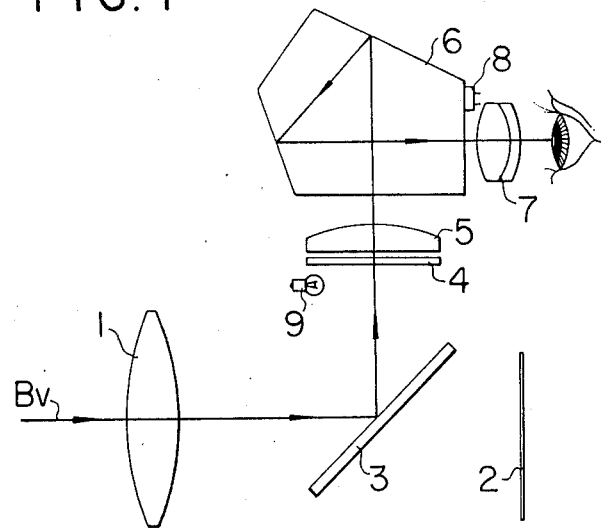
FIG. 1 is a schematic view showing the finder-optical system of a single lens reflex camera.
Figure 3:
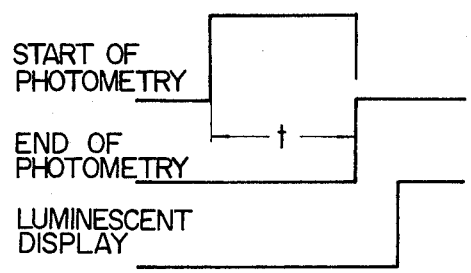
FIG. 3 is a timing chart illustrating the operation of the unit shown in FIG. 2.

The operation of the apparatus shown in FIG. 2 is illustrated in FIG. 3 where it will be noted that when the photometry is initiated, illumination data is sequentially stored in the memory circuit 11, and upon the lapse of a photometry period $t$ when the photometry is to be terminated, the delay circuit 12 operates to produce the end-of-photometry signal which is applied to both the memory circuit 11 and the delay circuit 13. Thereupon, the memory circuit 11 ceases to store the illumination data, and at the same time the delay circuit 13 operates to permit the luminescense or illumination of the display element 14 after a given period of time, thereby indicating the termination of the photometry by a luminescent display. The purpose of the delay circuit 13 is to provide a time interval during which a power source is stabilized, and where the power source is stablilized immediately, the delay circuit 13 may be removed. In this latter instance, it will be understood that the display element 14 initiates its luminescence simultaneously with the occurrence of the end-of-photometry signal.

Figure 4:
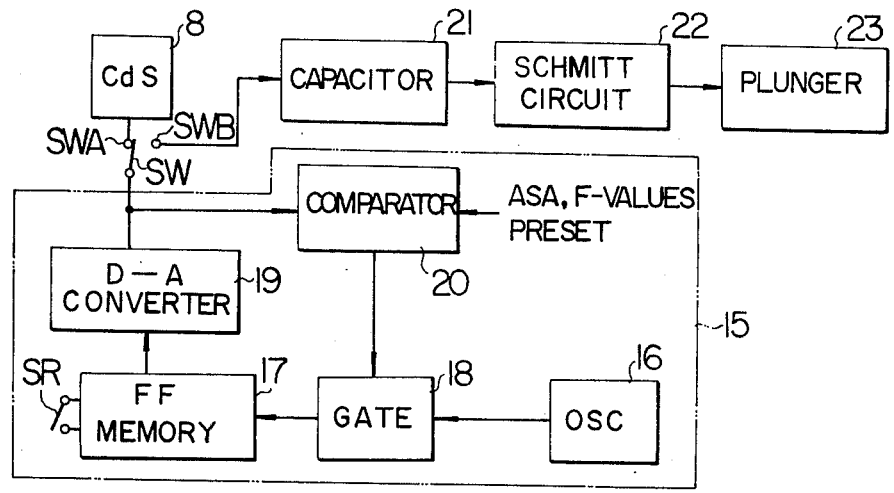
FIG. 4 is a block diagram of an electrical circuit of a single lens reflex camera which stores object illumination data as a digital quantity.
Figure 5:
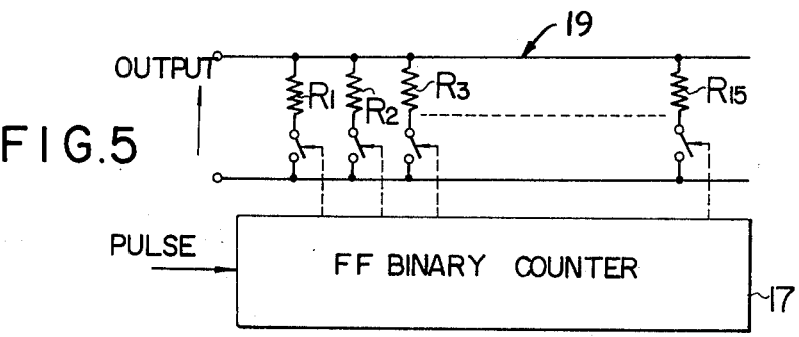
FIG. 5 is a schematic diagram of a D-A converter used in the circuit of FIG. 4.

On the other hand, the memory circuit 11 may be digital in nature in which event the delay circuits may be dispensed with. One example of a digital memory circuit is illustrated in FIGS. 4 and 5. In order to store the output of the light receiving element 8 which is an analogue quantity in a digital memory circuit, it is necessary to provide an analogue-to-digital converter (hereinafter referred to as A-D converter). Referring particularly to FIG. 4, an A-D converter 15 is indicated by a block shown in phantom lines, and comprises an oscillator 16 for producing pulses of a fixed frequency, a gate circuit 18 which passes the output pulses from the oscillator 16, a memory circuit 17 formed by a plurality of flipflop circuits which are driven by the pulses from the gate circuit 16, a D-A converter 19 which operates in response to a digital output from the memory circuit 17, and a comparator 20 to which the output of the D-A converter 19 and the output of the light receiving element 8 or CdS element are applied. The comparator 20 functions to close the gate circuit 18 when the photometric resistance of the CdS element is equal to the equivalent resistance presented by the D-A converter 19. Film speed, F-values and the like are pre-established within the comparator 20. A high input impedance, sensitivity and frequency response are required of the comparator since it should detect the coincidence between the voltage inputs from the light receiving element 8 and the D-A converter 19. A similar performance is required of the gate circuit 18 which functions to switch high frequency pulses.

The D-A converter 19 is shown in FIG. 5 as comprising fifteen weighting resistors $R_1$ to $R_{15}$ having different resistances connected in shunt with each other and in series with each of fifteen flipflop stages of a binary counter which constitutes the memory circuit 17. The resistance of the resistors $R_1$ to $R_{15}$ are chosen to cover a range of resistance through which the resistance of the light receiving element 8 may vary. Each of the weighting resistors $R_1$ to $R_{15}$ is connected in circuit when its associated flipflop stage is turned on. The resistances of these resistors can be determined in a binary fashion. As indicated in FIG. 4, the D-A converter 19 may be connected with a terminal SWB of a change-over switch SW having another terminal SWA connected with the light receiving element 8. Upon termination of the photometry, when the shutter is released, the switch SW is transferred from the terminal SWA to the terminal SWB, whereby the equivalent resistance stored in the memory is connected with a capacitor 21 to form a time constant circuit which automatically determines an exposure period. When the voltage across the capacitor 21 reaches a predetermined value, a Schmitt circuit 22 which forms a switching circuit is operated to actuate a solenoid operated plunger 23, thus closing the shutter. A Schmitt circuit 22 and a plunger 23 which are operated automatically by the time constant circuit are well known.

Figure 6:
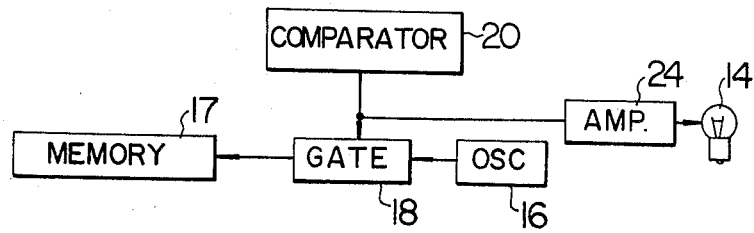
FIG. 6 is a block diagram showing another embodiment of the invention as applied to the camera circuit shown in FIG. 4.

In operation, a reset switch SR is initially closed to reset the flipflop stages of the memory circuit 17 and to open the gate circuit 18. Then pulses from the oscillator 16 are passed through the gate circuit 18 to be supplied into the memory circuit 17, whereby the successive stages of the memory circuit 17 are turned on in a sequential manner and the equivalent resistance presented by the D-A converter 19 varies from a higher to a lower value depending upon the number of pulses supplied. If the comparator 20 is established so as to compare the both outputs from the element 8 and the converter 19 on the basis of 1:1, the comparator 20 operates to produce a gate closing signal to the gate circuit 18 when the photometric resistance of the element 8 is equal to the equivalent resistance presented by the D-A converter 19, thereby storing a resistance which is equivalent to that of the light receiving element 8 in the memory circuit 17. Subsequently, upon shutter release, the switch SW is transferred to the terminal SWB, whereby a proper exposure period is automatically determined by a similar procedure as in a conventional electronic shutter. It will be appreciated that the photometry is terminated when the comparator 20 produces a gate closing signal, so that the gate closing signal may be fed to and amplified by an amplifier 24 (FIG. 6) before being supplied to display element 14, such as a lamp disposed within the light path of the finder, for illuminating it. In this manner, the display element 14 can be energized concurrently with the termination of the photometry or immidiately thereafter.

In the digital system described above, successive stages of the memory circuit 17 are sequentially turned on and off by pulses supplied thereto, thereby yielding a total of $2^{15} = 32,768$ combinations of resistance. This means that a maximum of 32,768 pulses is necessary. This will require a considerable length of time for counting the pulses, but such time can be reduced by using a counter of sequential comparison type as will be described below with reference to FIG. 7.

Figure 7:
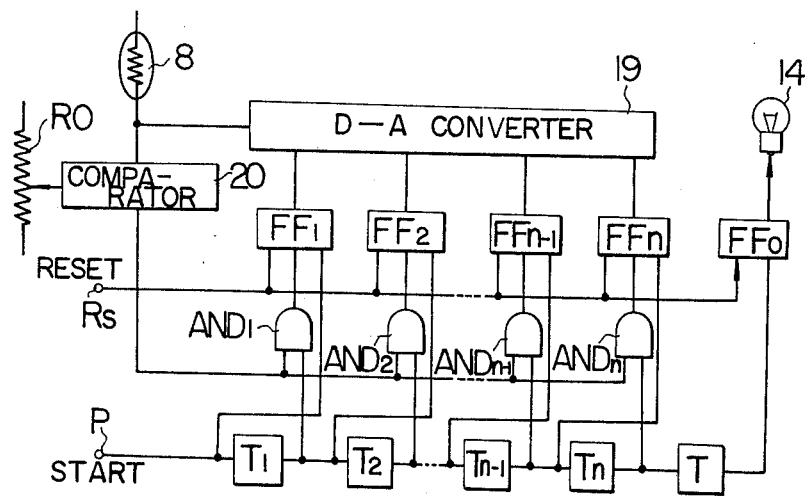
FIG. 7 is a block diagram of a further embodiment of the invention as applied to a camera incorporating a different digital memory system.

A counter of sequential comparison type does not have any specific main gate. Instead, when one pulse is supplied to its start terminal P, it is successively shifted through a plurality of delay ciruits $T_1, T_2 \ldots T_n$, driving the flipflop stages $FF_1, FF_2 \ldots FF_n$ through corresponding AND circuits $AND_1, AND_2 \ldots AND_n$ for comparing the resistance presented by the D-A converter 19 against the resistance of the light receiving element 8. One additional delay circuit T is connected to the output of the last delay circuit Tn of the series, and one additional flipflop stage $FF_0$ is connected to the output of the last flipflop circuit $FF_n$ of the series, and they are interconnected so that the output from the delay circuit T operates the flipflop circuit $FF_0$. The output of the latter causes the luminescence or illumination of the display element 14 such as a lamp. In this manner, the time interval required to count the pulses is greatly reduced, and display element 14 can be illuminated upon termination of the photometry. The flipflop circuits of the memory circuit 17 are reset by a signal applied to a reset terminal $R_s$. In FIG. 7, a resistor RO represents an adjustable resistor used to establish a film speed, F-value or the like.

It will be appreciated that the D-A converter shown in FIGS. 4 and 7 has been described as comprising resistors, but that it may be replaced by a bank of constant current sources having different magnitudes.

Figure 8:
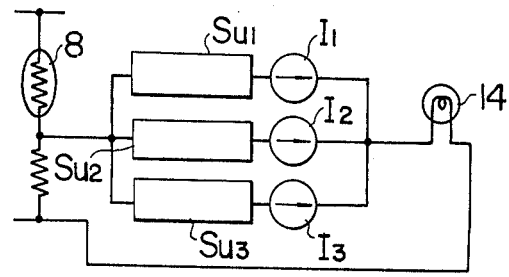
FIG. 8 is a block diagram of one example of the control means for controlling the intensity of luminescence in accordance with the invention.

In accordance with another aspect of the invention, the light quantity emitted by the display element 14 may be controlled in accordance with the brightness of an object being photographed. One example is shown in FIG. 8 where it will be noted that the voltage developed across the light receiving element 8 is applied to a plurality of Schmitt circuits $Su_1$ to $Su_3$ having different threshold values. Each of the Schmitt circuits is connected in series with a separate constant current source $I_1$ to $I_3$ and a common display element 14 such as a lamp. In this manner, when the object being photographed is under bright illumination, the light receiving element 8 will have a low resistance with a consequent low voltage drop, whereby such voltage can be detected by the Schmitt circuit having the lowest threshold value to cause a bright illumination of the display element 14. When the object being photographed is under dim illumination, the element 8 will exhibit a higher resistance with a consequent high voltage drop, which can be detected by the Schmitt circuit having the highest threshold value to cause an illumination or luminescence of the display element 14 at a low level. In this manner, the amount of illumination of luminescence of the display element 14 can be automatically controlled in correspondence to the brightness of an object being photographed.

Figure 9:
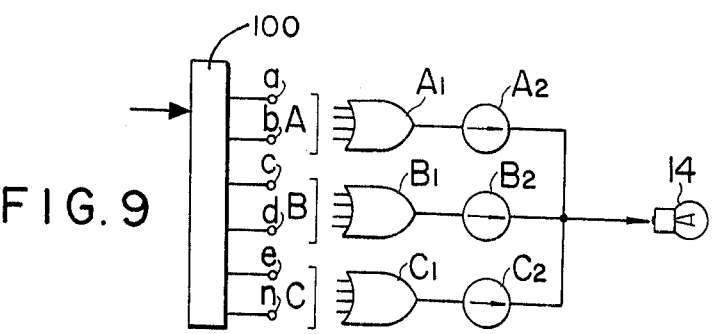
FIG. 9 is a block diagram illustrating another example of the control means.

Another example is shown in FIG. 9 which is useful when the illumination data is stored as a digital quantity. As mentioned previously, the stored content in the D-A coverter 19 represents the illumination data obtained by the light receiving element 8, or the exposure period. Utilizing this fact, the outputs from the respective flipflop stages of the memory circuit 17 are derived through an decoder 100, to a plurality of terminals $a, b \ldots n$, which are grouped into the inputs of OR gates $A_1$, $B_1$ and $C_1$, the outputs of which are connected with constant current sources $A_2, B_2$ and $C_2$ to energize the display element 14 such as a lamp. In this manner, the amount of illumination or luminescence of the display element varies with the stored content in the D-A converter 19, thus allowing the light quantity from the display element 14 to be automatically controlled in accordance with the brightness of an object being photographed.

While in the embodiments described above, the display element 14 comprises a single lamp, it should be understood that it may be replaced by a light emitting diode. It will be also noted that the illumination data represents an exposure period, but may be the one obtained when the camera is in a flash photographing mode.

What is claimed is:

1. A display system for object illumination data in a single lens reflex camera of the type comprising a taking lens for passing an image of an object being photographed into the camera; a movable reflecting mirror for reflecting said image after passage by said taking lens; a focussing screen located at a position conjugate to a photographic film disposed within the camera and on which said image is focussed; a finder for said focussing screen; and a light receiving element disposed within the light path of said finder for effecting photometry of the focussed image on said focussing screen, wherein the improvement comprises a memory circuit means for storing illumination data obtained by the light-receiving element; means for producing an end-of-photometry signal; means for conducting said signal to cut off the storage of said data in said memory circuit means; and a light-emitting display means disposed within the light path of the finder for displaying an indication of the production of an end-of-photometry signal when said signal is produced.

2. A display system for object illumination data in a single lens reflex camera of the type comprising a taking lens for passing an image of an object being photographed into the camera; a movable reflecting mirror for reflecting said image after passage by said taking lens; a focussing screen located at a position conjugate to a photographic film disposed within the camera and on which said image is focussed; a finder for said focussing screen; and a light receiving element disposed within the light path of said finder for effecting photometry of the focussed image on said focussing screen wherein the improvement comprises:

a memory circuit means for storing illumination data obtained by the light-receiving element;

means operatively connected to said memory circuit means for producing an end-of-photometry signal which cuts off the storage of said data in said memory circuit means;

a light-emitting display means disposed within the light path of the finder for displaying an indication of the illumination data;

means for converting the illumination data from the light-receiving element into a digital quantity for storage in said memory circuit means; and means for operating the display means only after the production of an end-of-photometry signal.

3. A system as in claim 1 wherein said means for producing an end-of-photometry signal comprises a first delay circuit.

4. A system as in claim 3 further comprising a second delay circuit connected between the output of said first delay circuit and said display means.

5. A system as in claim 2 further comprising means for operating said display means after the production of an end-of-photometry signal in response to the readout of said digital quantity from said memory circuit means and means for varying the intensity of illumination of the display means in accordance with the magnitude of said digital quantity to indicate the brightness of the object being photographed.

6. A system as in claim 5 wherein the means for varying the intensity of illumination comprises a plurality of Schmitt circuits having different threshold values connected in parallel with each other and a plurality of constant current sources respectively connected in series with said plurality of Schmitt circuits.

7. A system as in claim 2 wherein the means for converting the illumination data comprises:

oscillator means for producing pulses of a fixed frequency;

gating means for passing the output of said oscillator means to said memory circuit means;

D-A converter means for receiving the output of said memory circuit means; and comparator means for receiving the outputs of said D-A converter means and said light-receiving element and controlling said gating means.

8. A system as in claim 7 wherein said means for producing an end-of-photometry signal comprises said comparator means.

9. A system as in claim 8 further comprising means for operating said display means after the production of an end-of-photometry signal in response to the readout of said digital quantity from said memory circuit means.

10. A system as in claim 9 further comprising means for varying the intensity of illumination of the display means in accordance with the magnitude of said digital quantity to indicate the brightness of the object being photographed.

* * * * *